(12) United States Patent
Lopez (10) Patent No.: US 6,887,009 B1
(45) Date of Patent: May 3, 2005

(54) CYLINDRICAL JOINT AND RETICULATED FRAME STRUCTURE

(75) Inventor: Alfonso E. Lopez, The Woodlands, TX (US)

(73) Assignee: Conservatek Industries, Inc., Conroe, TX (US)

( * ) Notice: Subject to any disclaimer, the term of this patent is extended or adjusted under 35 U.S.C. 154(b) by 0 days.

(21) Appl. No.: 10/261,870

(22) Filed: Oct. 1, 2002

(51) Int. Cl.$^7$ ............................................. F16D 1/00
(52) U.S. Cl. ........................ 403/171; 403/175; 403/218
(58) Field of Search ................................. 403/169, 170, 403/171, 172, 173, 174, 175, 176, 178, 217, 218, 219

(56) References Cited

U.S. PATENT DOCUMENTS

| | | |
|---|---|---|
| 824,502 A | 6/1906 | Molloy |
| 3,063,519 A | 11/1962 | Richter |
| 3,192,669 A | 7/1965 | Hawkins |
| 3,220,152 A | 11/1965 | Sturm |
| 3,462,893 A | 8/1969 | Kaiser |
| 3,507,526 A | 4/1970 | Packman et al. |
| 3,999,336 A | 12/1976 | Bance |
| 4,193,706 A | 3/1980 | Eberlein et al. |
| 4,355,918 A | 10/1982 | Van Vliet |
| 4,608,790 A | 9/1986 | Eberlein et al. |
| 4,677,804 A | 7/1987 | Holt |
| 4,796,389 A | 1/1989 | Bini et al. |
| 4,991,371 A | 2/1991 | Preuss et al. |
| 5,051,019 A | 9/1991 | Kohl |
| 5,088,852 A * | 2/1992 | Davister ................ 403/171 X |
| 5,498,093 A * | 3/1996 | Imai ......................... 403/171 |
| 5,566,516 A | 10/1996 | Beaulieu |
| 5,867,961 A | 2/1999 | Castano |
| 5,956,917 A * | 9/1999 | Reynolds ................ 403/174 X |
| 6,108,984 A | 8/2000 | Davidson |
| 6,192,634 B1 | 2/2001 | Lopez |
| 6,240,694 B1 | 6/2001 | Castano |

* cited by examiner

Primary Examiner—John R. Cottingham
(74) Attorney, Agent, or Firm—Jenkens & Gilchrist A Professional Corp.

(57) ABSTRACT

Structural system and method are disclosed for constructing reticulated frame structures. Nodal joints having large diameter connectors are used to connect framing members to the structure nodes. The large diameter allows the connectors to directly support or bear the framing members. As such, compressive forces on the framing member may be transferred directly through the connector to the nodal joint through bearing action. A collar is threaded to the framing member at one end, and engages the connector at the other end. Cover panels may be disposed on the reticulated frame structure. Support members secure the cover panels to the framing members. Each support member is attached to a corresponding framing member and to the nodal joints in a manner to help resist bending loads and prevent axial rotation of the framing member.

22 Claims, 10 Drawing Sheets

CYLINDRICAL JOINT AND RETICULATED FRAME STRUCTURE

PRIOR RELATED APPLICATIONS

Not applicable.

FEDERALLY SPONSORED RESEARCH STATEMENT

Not applicable.

BACKGROUND OF THE INVENTION

1. Field of the Invention

The present invention relates to reticulated frame structures and, more particularly, to the use of nodal joints in the construction of such reticulated frame structures.

2. History of the Related Art

Generally, reticulated frame structures are made of a network of nodes and interconnecting members. The reticulated frame structure may have a single layer of interconnecting members, or there may be two or more layers connected parallel to one another and spaced apart by diagonal members. Such reticulated frame structures are commonly employed in the design, engineering, fabrication, and erection of, for example, domes, building facades, towers, stadium covers, bridges, and various other applications of space frames.

When the members are made of cylindrical tubes, connection to the nodes is generally pinned due to the configuration of the connection mechanisms. A typical pinned connection system employs a generally spherical node connected to a plurality of tubular framing members. Each tubular framing member is connected to the node by a connection assembly. The node typically has openings to receive parts of the connection assemblies, such as bolts. The ends of the tubular framing members are typically welded to other parts of the connection assemblies, such as end cones. The ends of the tubular framing members are often tapered to simplify or enhance the connection. Such a "tube and ball" system can be used to build extensive networks of nodes and framing members interlinked to form a variety of reticulated frame structures.

One existing type of tube and ball node system uses a spherical node with a plurality of rounded openings through which a bolt or pin is inserted and fixed therein. A funnel-shaped sleeve having a hollow cylindrical base is positioned between the spherical node and a hollow cylindrical framing member. A bolt is inserted through the framing member extending through the sleeve base and is rigidly attached by threading to the node. An externally accessible collar, which is rotationally fixed to the bolt, is provided to tighten the bolt to thereby attach the framing member to the spherical node. In this manner, shear, tensile, and compressive stresses are borne by the bolts.

In some cases, the compressive stresses are instead borne by the collar, as illustrated in U.S. Pat. No. 5,956,917 (Reynolds). The node system in this patent comprises a framing member, a block connector, an end cap, an end cap-block connector attachment means, and a collar. The end cap, movably attached to the block connector, is connected to both the collar and the framing member. To assemble the node system, the collar is slid onto the framing member and positioned at the end of the framing member. The framing member is then positioned relative to the block connector. Attached to the block connector is an end cap which is made to align with the framing member. A bolt is used to transfer the member tensile forces generated by the system. Once aligned, the end cap is shifted upwards and connected to the end of the framing member. The collar is then slid over the end cap toward the block connector and attached to the end cap. The collar transfers member compression forces generated by the system to the block connector.

A similar arrangement is described in U.S. Pat. No. 5,051,019 (Kohl). The node system in this patent comprises a faceted, spherical node member, and a conical connector member. The node member has a plurality of threaded sockets therein for receiving the conical connector member. The conical connector member has a nale screw-threaded portion extending axially from the narrow end of the connector member. The screw-threaded portion allows the conical connector member to be screwed into one of the thread sockets of the node member. A locating spigot extends axially from the larger end of the conical connector member. The locating spigot, in use, is fitted into the end of a tubular frame member. The tubular frame member has radially formed holes the rein for receiving pins, screws, and the like. The pins, screws, and the like extend through the holes in the tubular framing member and into a groove in the locating spigot. Such an arrangement holds the tubular framing member captive to the conical connector.

A characteristic of most existing node systems is that a bolt or similar attachment means is required to attach the framing members to the node. While the bolts are capable of transferring tensile forces to the node, they are generally less effective for transferring compressive forces and have very limited capacity to transfer bending moments. One reason for this drawback is the diameter of the bolts tends to be substantially smaller than the diameter of the framing members. As a result, for some of the existing systems, the compressive forces on the framing members are not transferred directly through the bolts. Instead, these forces are usually transferred through a collar, an end cap, a locknut, or the like. Such an arrangement increases the number of components required and adds complexity to the assembly process.

Further, existing systems have limited capacity to transfer moments at the joints. It has been shown that single layer systems with low capacity to transfer moments have extremely low buckling strength. This limitation has important implications in the case of glazing systems or glass structures. For example, the design of glass structural systems often requires the use of uncluttered systems with simple lines that provide unobstructed views and allow unobstructed light to come into the building. Single layer pinned connection systems have been employed for this purpose in small applications. However, because of the inherent lack of strength in single layer pinned connection arrangements, space frame systems with pinned connections are typically used in cluttered double layer configurations. Such double layer configurations are often undesirable because the excessive number of elements tends to prevent light from entering the architectural space.

In addition to forcing the use of double layer systems, for large or low curvature applications, pinned joint connections also adversely impact the design of the individual members. For example, when compared to the design a member with fixed connections, pinned joints at both ends require the use of shorter members or members with larger cross-sectional properties. The use of shorter members, in turn, increases the grid frequency and the number of components, and can result in increased manufacturing and field construction costs.

Furthermore, many of the existing system don't offer fully integrated glazing support elements. A secondary network of glazing support elements is typically added to provide support for the glass. This additional layer of members further clutters the glass support system. The fully integrated Spectraform glass support system eliminates the need of an additional layer of glass support elements.

Accordingly, it is desirable to provide a node system that does not use bolts or similar attachment means to attach the framing members to the node, or to transfer axial loads. It is further desirable to provide a simple node system that is capable of transferring out-of-plane moments, and wherein compressive forces may be transferred directly from the framing member to the connector. Finally, it is desirable to provide a system whose members incorporate fully integrated glass support system.

SUMMARY OF THE INVENTION

The invention is directed to a structural system and method for constructing reticulated frame structures. Nodal joints having large diameter connectors are used to connect framing members to the structure nodes. The large diameter of the connectors allows them to directly support or bear the framing members. As such, compressive forces on the framing member may be transferred directly through the connector to the nodal joint through bearing action. A collar is provided to attach the framing member to the connector. The collar is threaded to the framing member at one end, and engages the connector at the other end. Cover panels may be disposed on the reticulated frame structure such that each cover panel covers an area defined by at least three interconnected framing members. Support members aligned with and connected directly to the framing members secure the cover panels to the framing members. Each support member is attached to a corresponding framing member and to the nodal joints in a manner such that they help to resist bending loads and prevent axial rotation of the framing member.

BRIEF DESCRIPTION OF THE DRAWINGS

A better understanding of the invention may be had by reference to the following detailed description when taken in conjunction with the accompanying drawings, wherein.

DESCRIPTION OF EMBODIMENT OF THE INVENTION

Following is a detailed description of exemplary embodiments of the invention wherein reference numerals for the same and similar elements are carried forward throughout the various figures. It should be noted that the figures are not drawn to any particular scale and are provided here for illustrative purposes only.

As mentioned previously, embodiments of the invention provide a method and structural system for constructing a reticulated frame structure. The method and system of the invention includes a nodal joint. The nodal joint has a large diameter connector for connecting a framing member to a hub of the nodal joint. The size of the connector allows it to directly support or bear the framing member. As such, compressive forces on the framing members are transferred by bearing action acting directly on the connectors. A collar is used to attach the framing member to the connector. The collar is threaded to the framing member at one end, and engages the connector at the other end.

Figure 1:
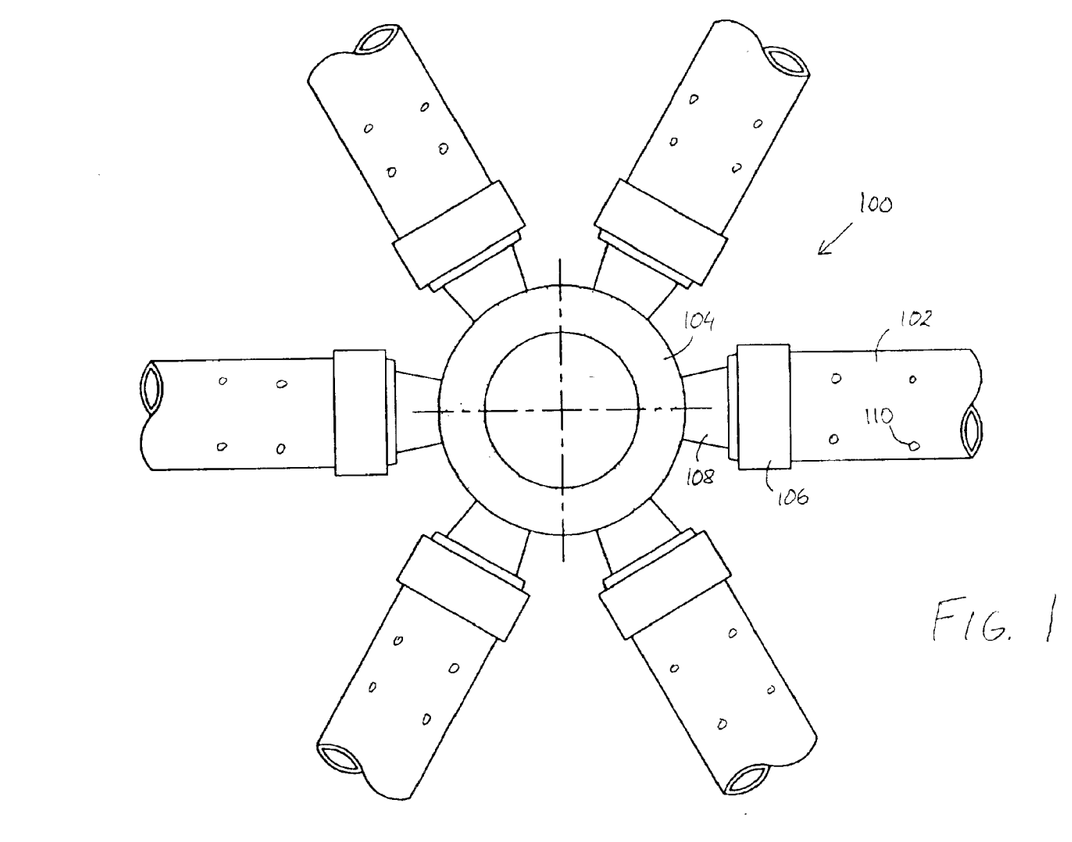
FIG. 1 illustrates a top view of a nodal joint with framing members connected thereto according to embodiments of the invention.

Referring now to FIG. 1, a nodal joint 100 according to embodiments of the invention is shown with several framing members 102. The nodal joint 100 allows the framing members to be connected to one another. Multiple nodal joints 100 can then be interconnected in various configurations to build, for example, domes, towers, stadium covers, bridges, and numerous other types of reticulated frame structures. The nodal joint 100 includes a hub 104, a collar 106, and a connector 108, each of which will be described in turn below.

Figure 2:
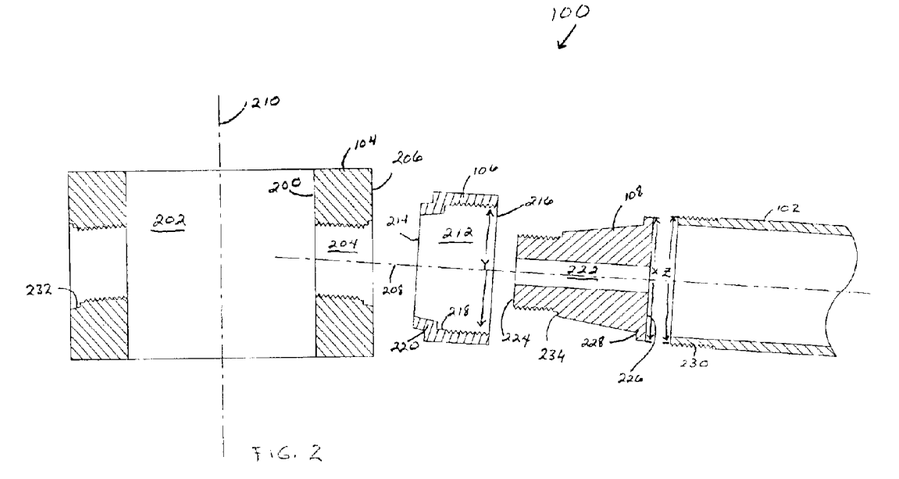
FIG. 2 illustrates a cross-section of the various components of the nodal joint with a framing member according to embodiments of the invention.

As can be seen in FIG. 2, the hub 104 is a substantially cylindrical hub, although other shapes (e.g., spherical) may certainly be used. In some embodiments, an inner surface 200 of the hub 104 defines a cylindrical opening 202 therethrough. Threaded (machined) holes or bores 204 are located at predefined locations and angles around an outer surface 206 of the hub 104. The bores 204 may penetrate all the way to the inner surface 200 of the hub as shown in FIG. 2, or they may not in other embodiments. The number of bores 204 in the hub may vary depending upon the design of the particular reticulated frame structure. In some embodiments, the axes 208 of the bores 204 may be co-planar, i.e., the bores are all leveled relative to one another. In other embodiments, the bores 204 may have axes that are angled a certain number of degrees from a normal axis 210. The angularity may be the same for all the bores 204, or some of the bores 204 may have different angularity relative to the axis 210. For example, some of the bores may be angled 80 degrees relative to the normal axis 210, while other bores may be angled 70 degrees relative to the normal axis. The angle between the bores and the node axis 210 defines the system curvature at the given node. Because the bores 204 can be machined at any desired angle, the system is extremely flexible and affords the design of systems with multiple curvatures. Similarly, the angle between bores will depend on the number of framing members 102 meeting at the node joint 100 and can be varied to suit any kind of reticulated geometry.

The collar 106 also is substantially cylindrical. A cylindrical passage 212 is formed in the collar 106 for receiving the connector 108. The cylindrical passage 212 defines a proximate opening 214 which is toward the hub 104, and a distal opening 216 which is away from the hub 104. In a preferred embodiment, the distal opening 216 has a larger diameter than the proximate opening 214. Threads are formed on a portion of the inner surface 218 defining the passage 212 beginning at the opening 216 and extending inward. The inner threads allow the collar 106 to be threaded to an end of one of the framing members 102 (which has matching outer threads). The proximate opening 214 of the collar 106 is adapted for engagement with and matches the geometric shape of the connector 108. In some embodiments, the engagement is effected by an inner portion 220 such as a neck in the proximate opening 214. The neck allows the collar 106 to transfer axial tension and bending loads from the framing member 102 to the connector 108.

The connector 108 is also substantially cylindrical, although it preferably has a substantially conical outline when viewed from the side. In some embodiments, an axial passage 222 may be formed in the connector 108 to reduce the weight thereof in applications where such a factor is important. The axial passage 222, when present, may be cylindrical, or it may be some other shape (e.g., conical). Outer threads are formed on a proximate end 224 of the connector 108. The threads match the threads in the bores 204 of the hub 104 and allow the connector 108 to be threaded to the hub 104. The distal end 226 of the connector 108 is contoured to engage the proximate opening 214 of the collar 106 (as mentioned above). To be more specific, the distal end 226 has an outer portion 228 such as a shoulder that engages the inner portion 220 or neck of the collar 106 when the collar 106 is tightened against the framing member 102. In a preferred embodiment, a diameter X of the outer portion 228 substantially matches an inner diameter Y of the distal opening 216.

The distal end 226 also allows the framing member 102 to directly bear on the connector 108. Axial compression forces are transferred through bearing action between the framing member 102 and the connector 108. In some embodiments, the outer diameter X of the outer portion 228 is substantially equal to an outer diame ter Z of the framing member 102. As a result, an end 230 of the framing member 102 can be abutted directly to the distal end 226 of the connector 108. Such an arrangement facilitates direct transfer of compressive forces from the framing member 102 to the connector 108 through bearing action between the two ends.

The framing member 102 is a substantially tubular framing member such as a pipe. In some embodiments, the pipe may be extruded aluminum, although other materials (e.g., steel) may certainly be used. In most embodiments, outer threads are formed on both ends 230 of the framing member 102 to facilitate threaded attachment to the collar 106. The dimensions and cross sectional properties (e.g., length diameter) of the framing member 102 may be any suitable dimensions for a particular application.

The threads of the framing member 102 and of the collar 106 may be either clockwise or counterclockwise so long as the match each other. Likewise, the treads of the connector 108 and the bores 204 may be clockwise or counterclockwise. More importantly, the two sets of threads are independent of one another so that the orientation of one does not dictate the orientation of the other.

In some embodiments, the hub 104 has seat portions 232 formed in the outer openings of the bores 204. The seat portions 232 are adapted to engage a stop portion 234 formed at the top of the connector threads. The stop portions 234, when tightened against the seat portions 232, assists in the transfer of axial compression loads from the connector 108 to the hub 104. The seat portions 232 also provide dimensional control of the hub-to-hub and/or center-to-center dimensions during manufacturing of the hub.

Figure 3:
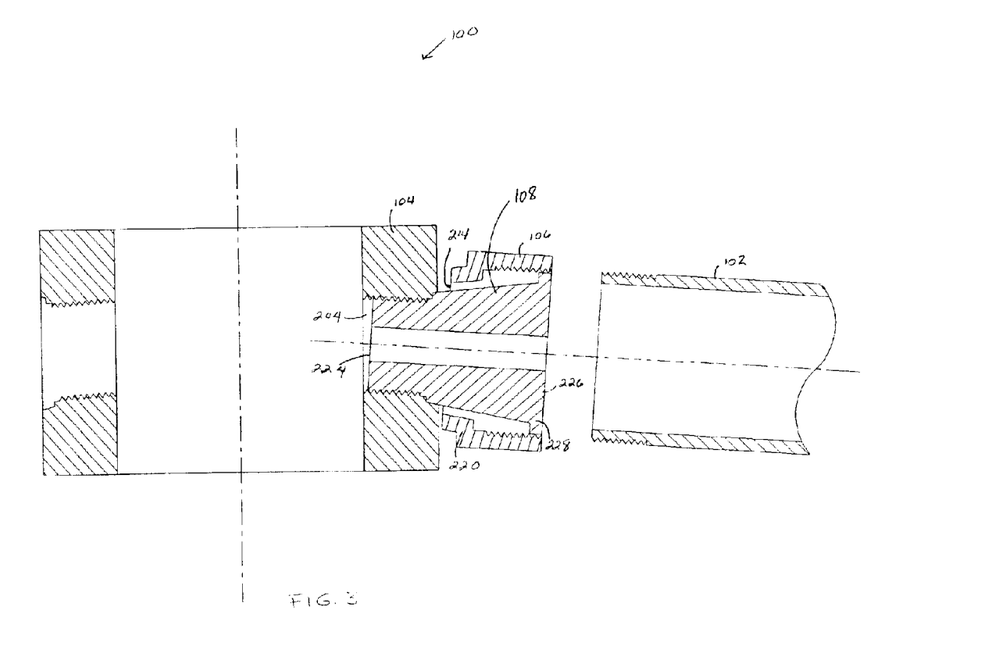
FIG. 3 illustrates a cross-section of the nodal joint and framing member during assembly according to embodiments of the invention.

The nodal joint 100 is shown in an assembled state in FIG. 3. As can be seen, the connector 108 has been inserted through the collar 106, and the proximate end 224 of the connector 108 is threaded to one of the bores 204 of the hub 104. The collar 106 is held by the connector 108 by virtue of the engagement between the outer portion 228 of the connector 108 and the inner portion 220 of the collar 106. The collar 106 is allowed to slide toward the hub 104 so that the entire collar is inward of the distal end 226 of the connector 108. That is to say, the connector 108 allows axial movement of the collar 106 away from the distal end 226 of the connector 108, and also retains the collar 106 on the connector 108. This arrangement facilitates installation of the framing members 102 between the nodal joints 100.

To install the framing members 102, the collars 106 of adjacent nodal joints 100 are moved toward the hubs 104, and the framing members 102 are inserted between the connectors 108. The collars 106 are then slid back over the connector 108 and threaded to the ends 230 of the framing members 102. Threading can be done by using an appropriate tool such as a wrench, or by hand in some cases. If desired, holes or notches may be formed in the surface of the collar 106 for engaging the tightening tool. After several (e.g., two or more) nodal joints 100 are connected in this manner, the spacing between neighboring nodal joints 100 will be substantially set so that the distance between the distal ends 226 of the connectors 108 will just match the length of the framing members 102. Additional connections may then be made by placing the framing members 102 between the connectors 108, and threading the collars 106 to the framing members 102.

In general, there should be very little or no gap between the distal ends 226 of the connectors and the ends 230 of the framing members during the assembly process in order to avoid damaging the threads of the various components. Therefore, in some embodiments, the nodal joints 100 may be set in their final positions by the use of installation templates (not expressly shown). The installation templates may be bolted to adjacent hubs 104 to precisely set the spacing between neighboring nodal joints 100, then removed after the assembly process is competed.

The collar-to-connector connection allows the entire nodal joint 100 to be pre-assembled (e.g., at a factory or manufacturing plant), since the collar 106 does not need to be tightened around the framing member 102 until actual use. To pre-assemble, the connector 108 is simply inserted through the collar 106 and threaded to the hub 104. Large quantities of nodal joints 100 may be pre-assembled in this manner, then transported to a separate location (or to the field) for assembly of the reticulated frame structure, or portions thereof.

Figure 4:
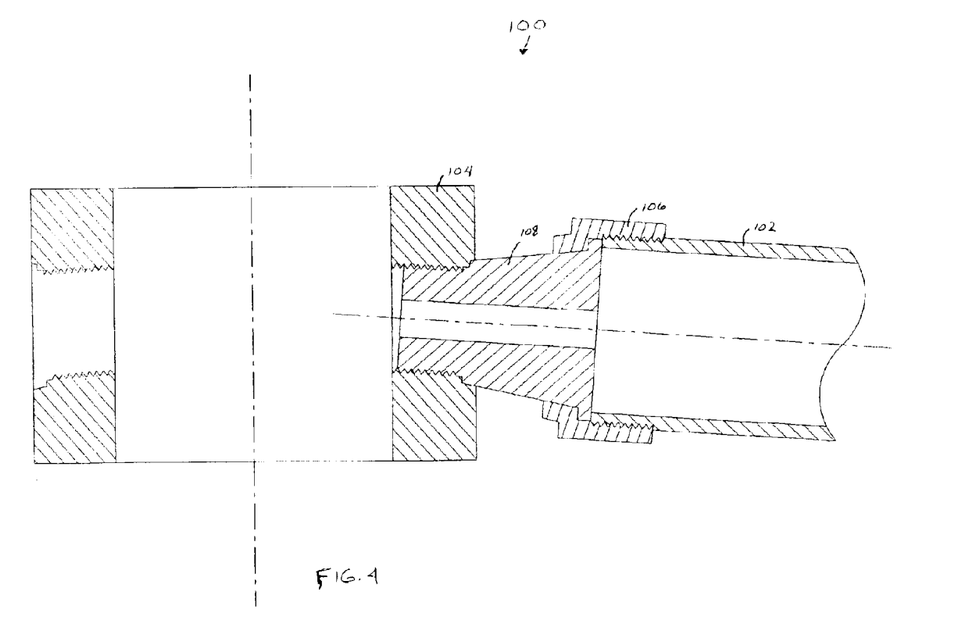
FIG. 4 illustrates a cross-section of the nodal joint in an assembled state including the framing member according to embodiments of the invention.

FIG. 4 shows the nodal joint 100 as it is connected to the framing member 102. Here, the collar 106 has been tightened around the framing member 102, which draws the collar 106 to the connector 108 and locks the framing member 102 against the connector 108. Note that the framing member 102 directly abuts the connector 108 to thereby transfer compressive forces from the framing member 102 directly through the connector 108 to the joint 100.

Figure 5:
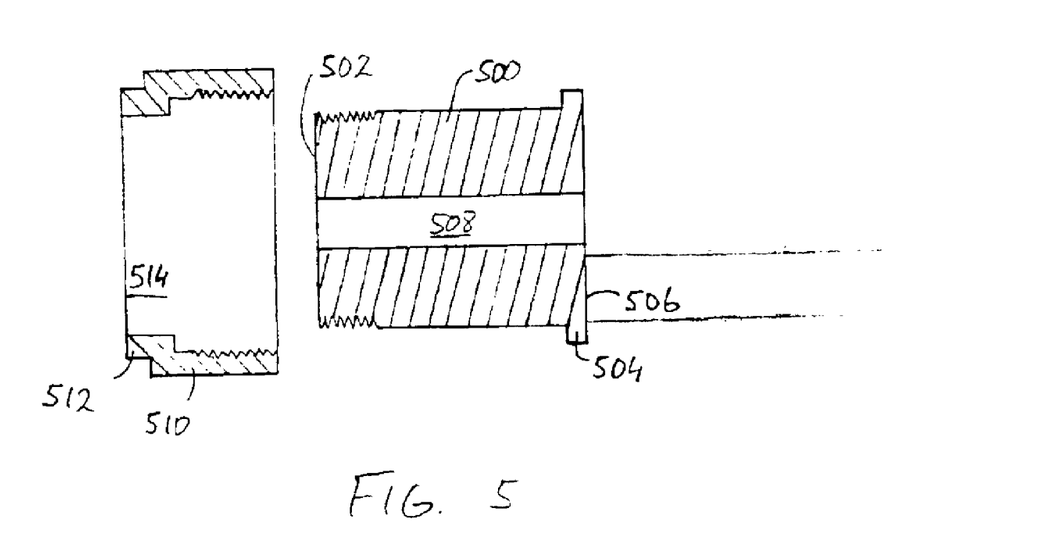
FIGS. 5–6 illustrate a cross-section of other collars and connectors according to embodiments of the invention.

Although the connector 108 has been shown and described as having a somewhat conical outline, the invention is not to be limited thereto. FIG. 5 illustrates an example of an alternative embodiment of the connector that may be equally suitable for use in certain applications. As can be seen in FIG. 5, a connector 500 has a threaded proximate end 502, and an outer portion 504, such as a shoulder, on a distal end 506. In some cases, an axial passage 508 may also be present. However, instead of a conical outline, the connector 500 has a purely cylindrical outline. A corresponding collar 510 has an inner portion 512 that defines a cylindrical passage 514. The collar 510 is otherwise similar to the collar 106.

Figure 6:
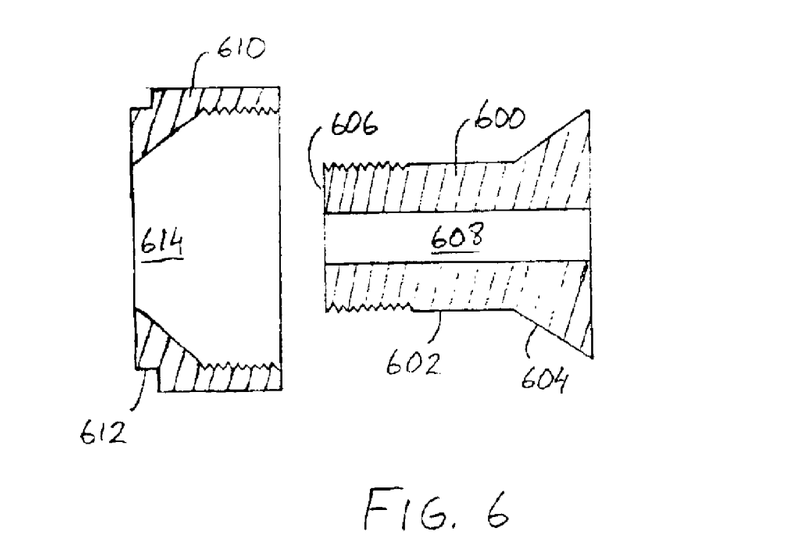

FIG. 6 illustrates yet another connector 600 that may be equally suitable for certain applications. The connector 600 has both a cylindrical portion 602 and a conical portion 604 that serves as the outer portion. A threaded distal end 606 serves to connect the connector 600 to the hub 104. If desired, an axial passage 608 may also be formed in the connector 600. Note that the outer/conical portion 604 may be somewhat more steeply tapered than the one shown in FIG. 2. The steeper tapering is provided in order to maximize the engagement area between the connector 600 and a corresponding collar 610. The corresponding collar 610 has an inner portion 612 that defines an equally tapered conical passage 614, but is otherwise similar to the collar 106.

Figure 7:
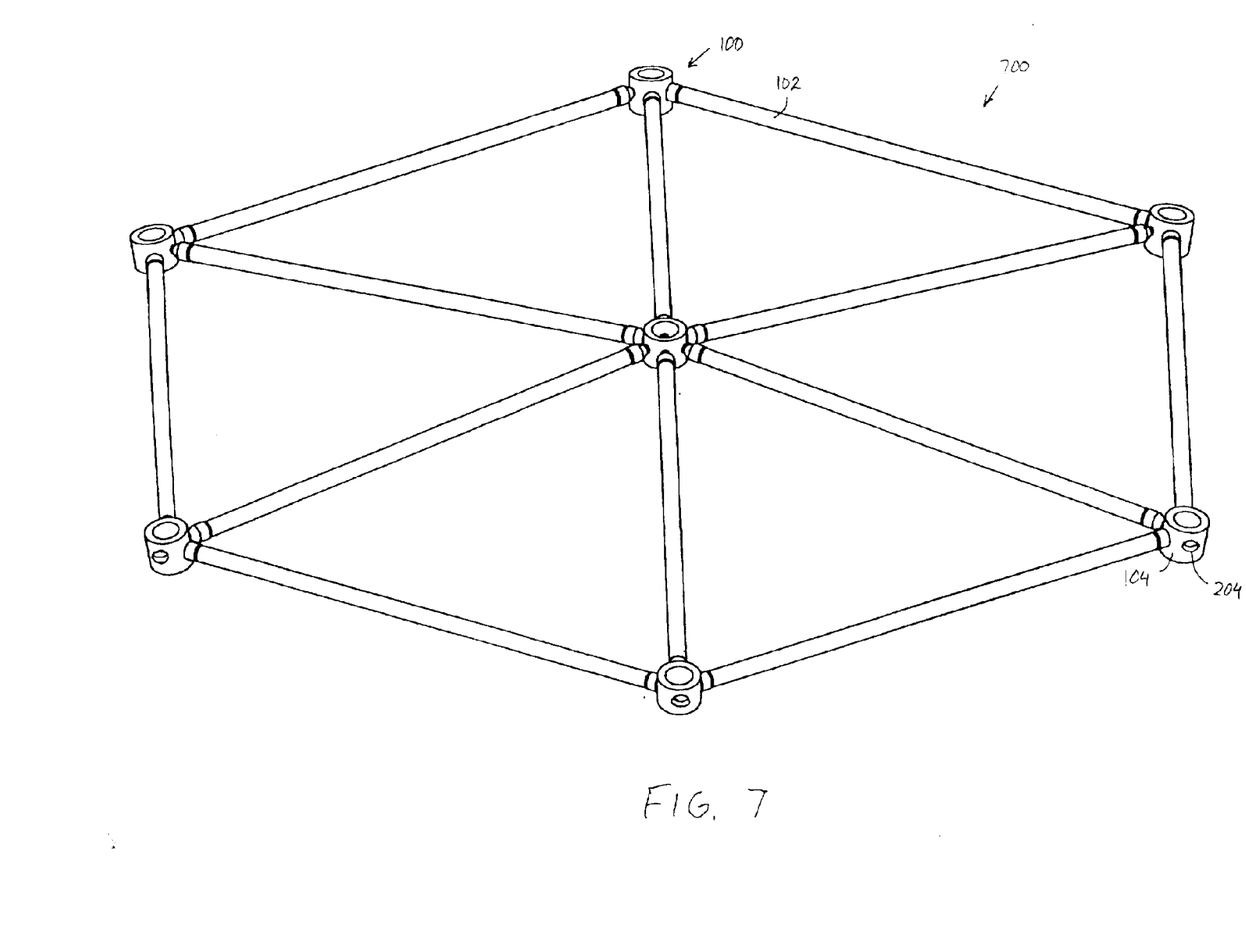
FIG. 7 illustrates a perspective view of a single layer configuration according to embodiments of the invention.

Referring now to FIG. 7, an exemplary portion or subassembly 700 of a reticulated frame structure is shown. Such a reticulated subassembly 700 may be constructed by connecting several nodal joints 100 (only one labeled here) and framing members 102 (only one labeled here) together in the manner described above. The reticulated subassembly 700 shown in FIG. 7 is for a single layer, substantially planar, reticulated frame structure. Note that the framing members 102 are connected together in a substantially coplanar configuration. This coplanarity allows the subassembly 700 to be used in a flat reticulated frame structure, or a flat portion of the reticulated frame structure.

Figure 8:
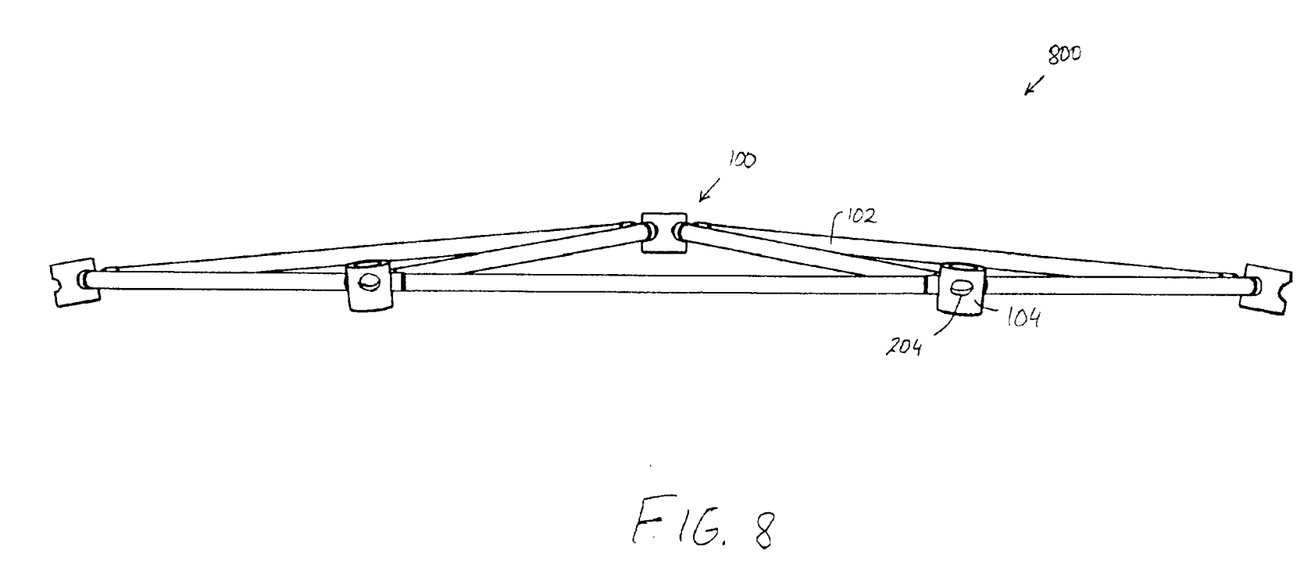
FIG. 8 illustrates a side view of another single layer configuration according to embodiments of the invention.

FIG. 8 is a side view of a reticulated subassembly 800 that may be used to construct a curved reticulated frame structure. The reticulated subassembly 800 shown in FIG. 8 is different from that shown in FIG. 7 in that the framing members 102 are connected together in a non-coplanar configuration. The non-coplanarity allows the subassembly 800 to be used to form a curved reticulated frame structure or a curved portion thereof (See FIG. 8.) The degree of curvature may be controlled by controlling the angularity of the bore holes (hence, of the framing members) relative to the hub axis.

Figure 9A:
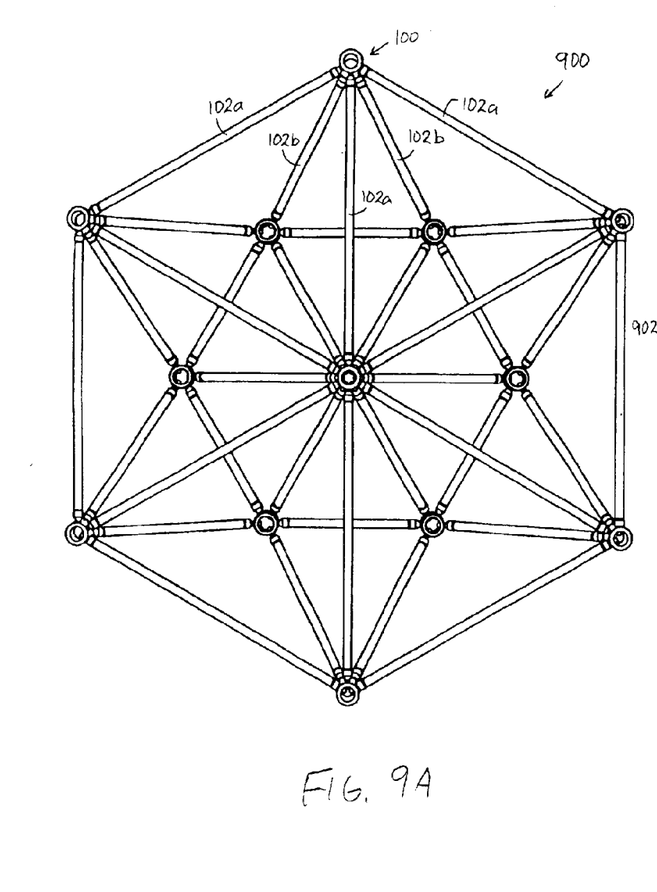
FIGS. 9A–9B illustrate a top and side view of a two layer configuration according to embodiments of the invention.
Figure 9B:
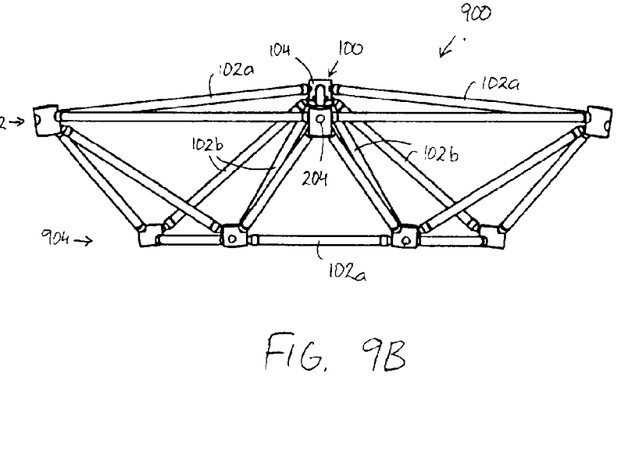

FIGS. 9A–9B show a top and side view, respectively, of a reticulated subassembly 900 that may be used to construct a double layer reticulated frame structure. As can be seen, a single nodal joint 100 can have network framing members 102a and diagonal framing members 102b. The network framing members 102a form an outer network 902 and an inner network 904 (seen more clearly in FIG. 9B), while the diagonal framing members 102b connect the two network layers. Such a reticulated subassembly 900 allows a double layer reticulated frame structure to be built. The angularity of the network framing members [see comment on paragraph 43] 102a determines the degree of curvature of the subassembly 900.

Construction of a single or double layer reticulated frame structure sometimes involves the use of prefabricated reticulated subassemblies, such as the one in FIGS. 7–9 above. In some embodiments, the subassemblies may be prefabricated at ground level, then lifted to their final position in the reticulated frame structure. At the construction lift/site, one or more towers, cranes, or other support structures may be used to elevate the subassemblies to the desired height. Additional subassemblies may then be connected to that subassembly to build the reticulated frame structure. The additional subassemblies may be connected via the unused bores 204 (see FIGS. 7–9). An exemplary method of constructing a reticulated frame structure is described in U.S. Pat. No. 6,192,634 (Lopez), which is hereby incorporated by reference.

Figure 10A:
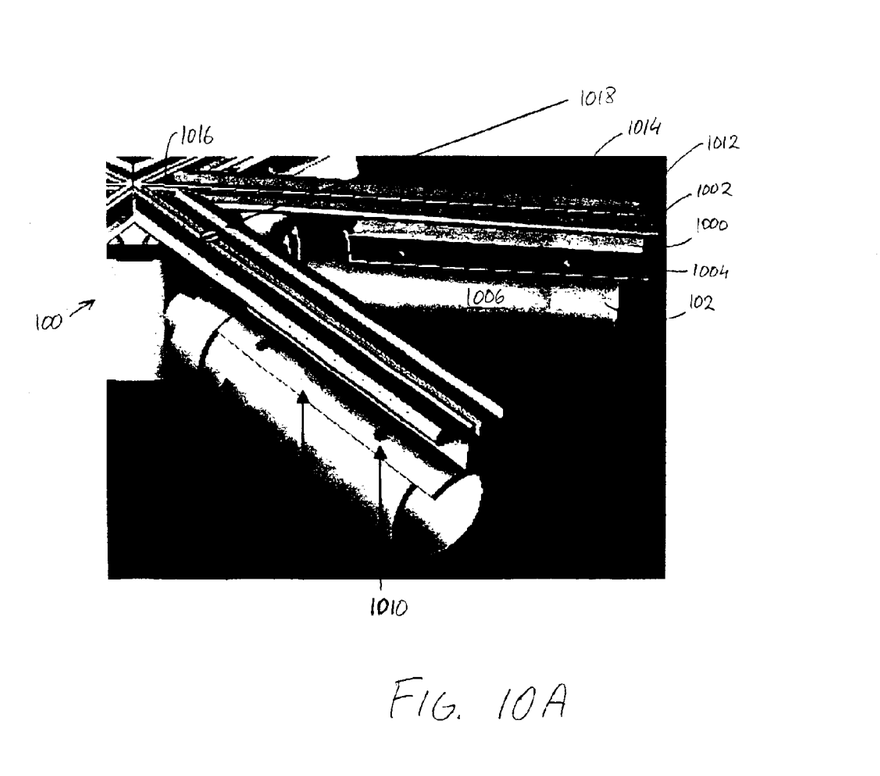
FIGS. 10A–10B illustrate a perspective view and a cross-section view, respectively, of a nodal joint member, and cover panel support member according to embodiments of the invention.
Figure 10B:
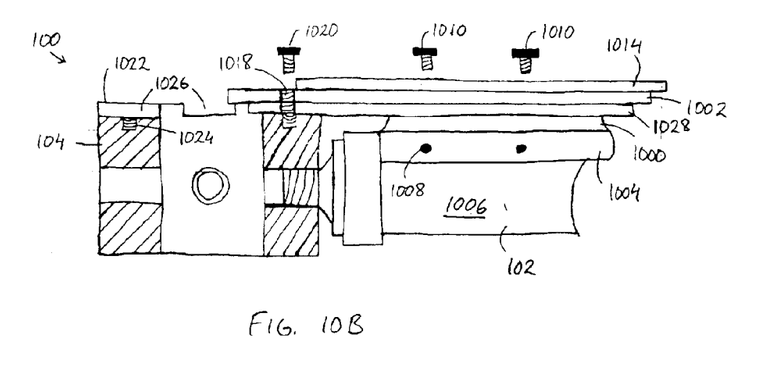

In addition, the nodal joints 100 and framing members 102 allow cover panels and the support members therefor to be attached to the framing members. FIGS. 10A–10B illustrate a side view and a partial cross-sectional view, respectively, of cover panel support members 1000. As can be seen, each support member 1000 is preferably an I-beam (although other cross-sectional shapes can be used) having a length approximately equal to the length of the framing member 102. The I-beam is preferably made of extruded aluminum, or steel, or other suitable materials.

Each I-beam includes a top flange 1002 and a bottom flange 1004. In some embodiments, the bottom flange 1004 is adapted to conform to the outer surface 1006 of the framing member 102. More specifically, the bottom flange 1004 is preferably contoured to fit over the curved outer surface 1006 of the framing member 102. A plurality of holes 1008 are formed in the bottom flange 1004. Matching tapped holes 110 (see FIG. 1) are formed in the framing member 102. The holes 1008 and 110 allow the support member 1000 to be attached to the framing member 102. Preferably, the holes 1008 and 110 are drilled and tapped in the field during the assembly process. It is also possible to form the holes 1008 and 110 prior to assembly in the field. Assembly may then be accomplished by adjusting the framing member 102 until the holes 1008 and 110 are aligned on top of each other. Bolts 1010 are then placed through the holes 1008 and 110 and tightened using an appropriate tool such as a wrench. Note that although bolts are used in this embodiment and the following embodiments, other suitable attachment means may be certainly used and the invention is not to be limited any particular attachment means.

An advantage of the above arrangement is the panel support members 1000 restrain the framing members 102 against rotation after installation is completed. Without such anti-rotation support, the framing members 102 may tend to rotate under certain conditions and thereby weakening the connection to the nodal joint 100. Alternatively, set screws may be placed through the collars 106 into the framing members 102 to provide the anti-rotation support. The set screws are generally well known in this art and are therefore not expressly shown here. Set screws may also be used between the collars 106 and the connectors 108, and the connectors 108 and the hubs 104 to prevent rotation.

Referring still to FIGS. 10A–10B, the ends 1016 of the top flange 1002 extend just over the hub 104 of the nodal joint 100 and are coped. The coped ends 1016 of the top flanges 1002 allow multiple support members 1000 to converge over the hub 104. Each end 1016 of the top flange 1002 is adapted with a hole 1018 (better seen in FIG. 10B) to receive a bolt 1020 therein, in some embodiments. Likewise, the top surface 1022 of the hub 104 has corresponding holes 1024 for receiving the bolt 1020. Each tapped hole 1024 is preferably positioned directly above a bore 204. The bolt 1020 can then be placed through the holes 1018 and 1024 and tightened using an appropriate tool. Such an arrangement allows the support member 1000 to also be attached to the hub 104 in addition to being attached to the framing member 102.

In some embodiments, grooves 1026 are formed on the top surface 1022 of the hub 104 over the tapped holes 1024. As such, the grooves 1026 are also positioned directly above the bores 204. The grooves 1026 are designed to receive a guide 1028 that is part of the panel support members 1000. The guides 1028, when placed in the grooves 1026, help ensure that the panel support members 1000 are aligned at the proper angle.

Figure 11A:
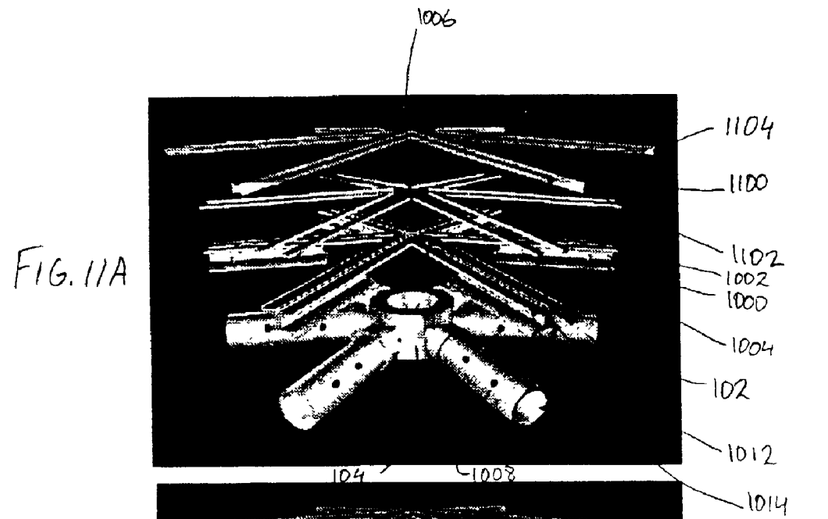
FIGS. 11A–11C illustrate the assembly of the nodal joint, member, cover panel, and support members according to embodiments of the invention.
Figure 11B:
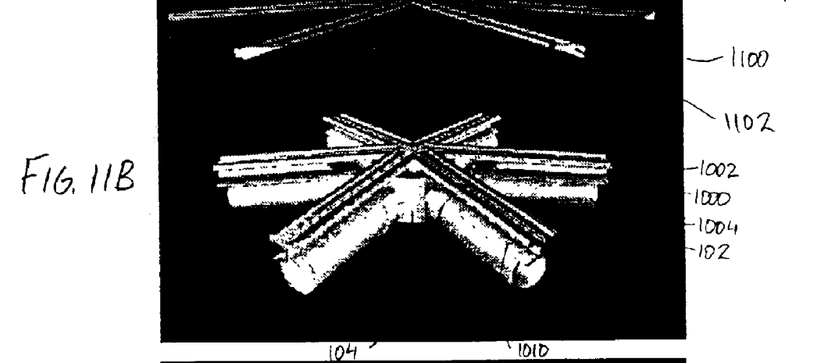
Figure 11C:
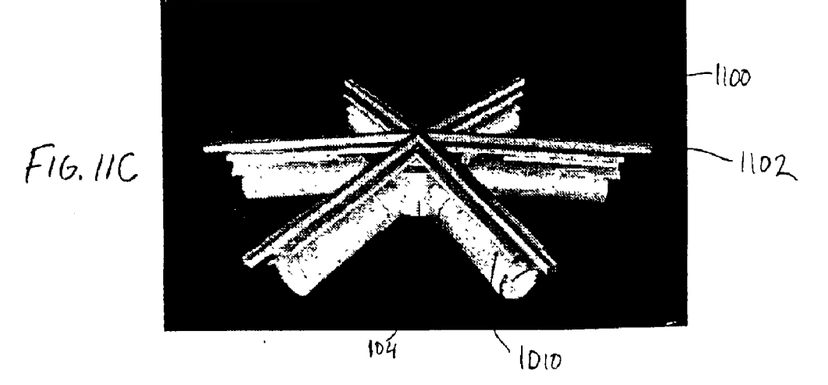

The panel support members 1000 may be used to secure cover panels to the framing members 102. Where the cover panels are glass, this process is referred to as glazing and is generally known to those skilled in reticulated frame construction. FIGS. 11A–11C illustrate one exemplary glazing method for securing a cover panel 1100 to the framing members 102. The method calls for the cover panels 1100 to be supported by foam pads 1102 and connected to the framing members 102 with, for example, structural silicone. Each cover panel 1100 is adapted to fit into a frame 1104 (only one labeled here) that is configured to hold the cover panel 1100. Although glass was used in this example other types of materials may also be used for the cover panels 1100, such as plexiglass or aluminum. The cover panels 1100 may be transparent, opaque, or translucent.

To secure the cover panels 1100, several panel support members 1000 are connected to the hubs 104 in the manner described above to establish the final nodal joint locations. Note the panel support members 1000 preferably already have the foam pads 1102 attached thereon at this point. Next, the framing members 102 are attached to the panel support members 1000 and connected to the nodal joints 100. The cover panels 1100 are then placed in position on the foam pads 1102 and secured to the panel support members 1000 with structural silicone. The connections between the framing members 102 and the nodal joints 100 are tightened prior to securing the cover panels 1100.

An advantage of the above arrangement is that the panel support members 1000 may be used to align the framing members 102 and the nodal joints 100. The panel support members 1000 also provide restraint against rotation, although set screws might be also used for this purpose (as mentioned above). If no panel support members are needed for a particular application, installation templates (not expressly shown) may be bolted to the hubs to set the spacing and alignment between the framing members 102 and the nodal joints 100 to avoid potentially damaging the threads of the various components.

As demonstrated by the foregoing, embodiments of the invention provide a method and apparatus for constructing a reticulated frame structure. While a limited number of embodiments have been disclosed herein, those of ordinary skill in the art will recognize that variations and modifications from the described embodiments may be derived without departing from the scope of the invention. Accordingly, the appended claims are intended to cover all such variations and modifications as falling within the scope of the invention.

I claim:

1. A reticulated frame structure, comprising:
    framing members; and
    one or more nodal joints connecting said framing members to one another, each nodal joint including:
    a hub having threaded bores disposed in an outer surface of said hub at predefined locations and angles;
    a collar having a proximate opening relative to said hub and a distal opening relative to said hub, said distal opening adapted for threaded attachment to one of said framing members; and
    a connector capable of being inserted in said collar, said connector including a proximate end adapted to pass through said collar for attachment to one of said threaded bores, and a distal end adapted to engage said collar such that said collar is restrained against axial and lateral movement, said distal end having a size that is sufficiently large to directly bear one of said framing members.

2. The reticulated frame structure according to claim 1, further comprising cover panels disposed on said reticulated frame structure, each cover panel covering an area defined by at least three interconnected framing members; and
    panel support members adapted to secure said cover panels to said framing members, each panel support member attached to a corresponding one of said framing members in a manner to prevent axial rotation of said framing member.

3. The reticulated frame structure according to claim 2, wherein said panel support members comprise I-beams.

4. The reticulated frame structure according to claim 3, wherein said I beams are made of extruded aluminum.

5. The reticulated frame structure according to claim 3, wherein a bottom flange of each I-beam is conformed to an outer surface of a framing member.

6. The reticulated frame structure according to claim 3, wherein a top flange of each I-beam is adapted to secure said cover panels.

7. The reticulated frame structure according to claim 2, wherein each panel support member is attached to a framing member by one or more bolts.

8. The reticulated frame structure according to claim 2, wherein each panel support member is attached to a hub by one or more bolts.

9. The reticulated frame structure according to claim 2, wherein each panel support member is oriented by grooves formed on a top surface of said hub.

10. The reticulated frame structure according to claim 1, wherein said framing members comprise pipes.

11. The reticulated frame structure according to claim 10, wherein said pipes are made of extruded aluminum.

12. The reticulated frame structure according to claim 1, wherein said framing members are interconnected so as to form a single lattice structure.

13. The reticulated frame structure according to claim 1, wherein said framing members are interconnected so as to form a double lattice structure.

14. The reticulated frame structure according to claim 1, wherein said framing members are interconnected so as to form a single curvature structure.

15. The reticulated frame structure according to claim 1, wherein said framing members are interconnected so as to form a double curvature structure.

16. The reticulated frame structure according to claim 2, wherein said cover panels are substantially transparent.

17. The reticulated frame structure according to claim 2, wherein said bores have a seat portion formed therein, said seat portions adapted to engage a stop portion formed on said connector.

18. A reticulated frame structure, comprising:
    framing members;
    means for connecting said framing members to one another; and
    means for assembling said connected framing members to form said reticulated frame structure, said means for connecting including:
    a hub having threaded bores disposed in an outer surface of said hub at predefined locations and angles;

a collar having a proximate opening relative to said hub and a distal opening relative to said hub, said distal opening adapted for threaded attachment to one of said framing members; and a connector capable of being inserted in said collar, said connector including a proximate end adapted to pass through said collar for attachment to one of said threaded bores, and a distal end adapted to engage said collar such that said collar retains axial and rotational movement prior to tightening of said collar, said distal end having a size that is sufficiently large to directly bear one of said framing members.

19. The reticulated frame structure according to claim 18, further comprising means for attaching cover panel support members to preselected ones of said framing members, and means for securing cover panels to said panel support members.

20. The reticulated frame structure according to claim 18, further comprising means for assembling a subassembly comprising two or more of said connected framing members.

21. The reticulated frame structure according to claim 18, further comprising means for connecting a plurality of said subassemblies together.

22. The reticulated frame structure according to claim, 18 further comprising means for aligning said framing members.

* * * * *